(12) United States Patent
Martin et al.

(10) Patent No.: US 12,264,501 B2
(45) Date of Patent: *Apr. 1, 2025

(54) MOTOR GEAR DRIVE RELEASE

(71) Applicant: ASSA ABLOY Level LLC, New Haven, CT (US)

(72) Inventors: John H. Martin, Redwood City, CA (US); Kenneth D. Goto, Redwood City, CA (US); Thomas E. King, Redwood City, CA (US); Jordan R. Fountain, Truckee, CA (US)

(73) Assignee: ASSA ABLOY Level LLC, New Haven, CT (US)

( * ) Notice: Subject to any disclaimer, the term of this patent is extended or adjusted under 35 U.S.C. 154(b) by 637 days.

This patent is subject to a terminal disclaimer.

(21) Appl. No.: 17/180,472

(22) Filed: Feb. 19, 2021

(65) Prior Publication Data

US 2021/0172197 A1 Jun. 10, 2021

Related U.S. Application Data

(63) Continuation of application No. 15/709,396, filed on Sep. 19, 2017, now Pat. No. 10,954,693.
(Continued)

(51) Int. Cl.
*E05B 47/00* (2006.01)
*E05B 9/00* (2006.01)
(Continued)

(52) U.S. Cl.
CPC .............. *E05B 47/00* (2013.01); *E05B 9/002* (2013.01); *E05B 9/02* (2013.01); *E05B 15/0205* (2013.01);
(Continued)

(58) Field of Classification Search
CPC ......... E05B 47/0012; E05B 2047/0084; E05B 2047/0086; E05B 2047/002;
(Continued)

(56) References Cited

U.S. PATENT DOCUMENTS 3,566,633 A  3/1971 Borck
5,199,288 A  4/1993 Merilaeinen et al.
(Continued)

FOREIGN PATENT DOCUMENTS

DE  102011103337 A1 * 11/2012  ......... E05B 47/0615
EP  1418295 A1 *  5/2004  ......... E05B 47/0012
(Continued)

OTHER PUBLICATIONS

Machine translation of KR 200446206 Y1 (Year: 2009).*
(Continued)

*Primary Examiner* — Gilbert Y Lee
*Assistant Examiner* — Peter H Watson
(74) *Attorney, Agent, or Firm* — Wolf, Greenfield & Sacks, P.C.

(57) ABSTRACT

Mechanically or electromechanically positioning a deadbolt used to lock or unlock a door is disclosed. An electromechanical lock can include a deadbolt to be positioned to lock or unlock a door. The deadbolt can be mechanically positioned based on the rotation of a paddle of the electromechanical lock or electromechanically positioned via a motor being turned on to position the deadbolt. A disengagement mechanism can disengage an engagement cog from a worm gear hub of a gear train of the motor upon the mechanical positioning, but remain engaged upon the electromechanical positioning.

10 Claims, 9 Drawing Sheets

Related U.S. Application Data (60) Provisional application No. 62/396,794, filed on Sep. 19, 2016.

(51) Int. Cl.

| | | |
|---|---|---|
| *E05B 9/02* | (2006.01) | |
| *E05B 15/02* | (2006.01) | |
| *E05B 15/10* | (2006.01) | |
| *E05B 15/16* | (2006.01) | |
| *E05B 17/00* | (2006.01) | |
| *E05B 17/20* | (2006.01) | |
| *E05B 17/22* | (2006.01) | |
| *E05B 33/00* | (2006.01) | |
| *E05B 45/06* | (2006.01) | |
| *E05B 47/02* | (2006.01) | |
| *E05B 51/00* | (2006.01) | |
| *E05B 63/00* | (2006.01) | |
| *E05B 63/06* | (2006.01) | |
| *G01P 15/00* | (2006.01) | |
| *G07C 9/00* | (2020.01) | |

(52) U.S. Cl.
CPC .......... *E05B 15/10* (2013.01); *E05B 15/1621* (2013.01); *E05B 17/0004* (2013.01); *E05B 17/20* (2013.01); *E05B 17/2026* (2013.01); *E05B 17/2049* (2013.01); *E05B 17/22* (2013.01); *E05B 33/00* (2013.01); *E05B 45/06* (2013.01); *E05B 47/0001* (2013.01); *E05B 47/0012* (2013.01); *E05B 47/026* (2013.01); *E05B 51/005* (2013.01); *E05B 63/0056* (2013.01); *E05B 63/06* (2013.01); *G01P 15/005* (2013.01); *G07C 9/00174* (2013.01); *G07C 9/00182* (2013.01); *G07C 9/00944* (2013.01); *E05B 2009/004* (2013.01); *E05B 2015/023* (2013.01); *E05B 2045/067* (2013.01); *E05B 2047/0016* (2013.01); *E05B 2047/002* (2013.01); *E05B 2047/0024* (2013.01); *E05B 2047/0026* (2013.01); *E05B 2047/003* (2013.01); *E05B 2047/0034* (2013.01); *E05B 2047/0036* (2013.01); *E05B 2047/0048* (2013.01); *E05B 2047/0058* (2013.01); *E05B 2047/0059* (2013.01); *E05B 2047/0067* (2013.01); *E05B 2047/0069* (2013.01); *E05B 2047/0072* (2013.01); *E05B 2047/0081* (2013.01); *E05B 2047/0084* (2013.01); *E05B 2047/0094* (2013.01); *E05B 2047/0095* (2013.01); *G07C 2009/0019* (2013.01); *G07C 9/00309* (2013.01); *G07C 2009/00412* (2013.01); *G07C 2009/00769* (2013.01); *G07C 2209/62* (2013.01); *Y10S 292/60* (2013.01); *Y10T 292/096* (2015.04); *Y10T 292/0977* (2015.04); *Y10T 292/1021* (2015.04); *Y10T 292/62* (2015.04)

(58) Field of Classification Search
CPC ..... E05B 2047/0024; E05B 2047/0026; E05B 2047/0028; E05B 2047/003; E05B 2047/0031; E05B 2047/0094; E05B 2047/0095; E05B 47/068; G07C 9/00944
See application file for complete search history.

(56) References Cited

U.S. PATENT DOCUMENTS

| | | |
|---|---|---|
| 6,517,127 B1 | 2/2003 | Lu et al. |
| 6,807,834 B2 | 10/2004 | Tsai |
| 6,832,500 B1 | 12/2004 | Chen |
| 7,096,697 B2 | 8/2006 | Keightly |
| 7,543,469 B1 * | 6/2009 | Tseng .................. E05B 47/068 |
| | | 292/144 |
| 7,770,423 B2 | 8/2010 | Wu |
| 7,827,837 B2 | 11/2010 | Huang et al. |
| 8,365,561 B2 | 2/2013 | Chang |
| 8,621,900 B2 | 1/2014 | Wu et al. |
| 9,500,005 B2 | 11/2016 | Chen |
| 9,982,462 B2 | 5/2018 | Lin et al. |
| 10,138,036 B1 | 11/2018 | Schwimer |
| 10,577,831 B2 | 3/2020 | Martin et al. |
| 2003/0209043 A1 * | 11/2003 | Yeh .................... E05B 47/0012 |
| | | 70/280 |
| 2005/0029345 A1 | 2/2005 | Waterhouse et al. |
| 2007/0169525 A1 | 7/2007 | Chang |
| 2009/0211320 A1 * | 8/2009 | Wu .................... E05B 47/0012 |
| | | 70/277 |
| 2014/0265357 A1 * | 9/2014 | Romero ................ E05B 63/00 |
| | | 292/140 |
| 2015/0028995 A1 * | 1/2015 | Gautama ............ G07C 9/00944 |
| | | 340/5.72 |
| 2015/0075233 A1 | 3/2015 | Pluta |
| 2017/0370127 A1 | 12/2017 | Huang et al. |
| 2018/0080255 A1 | 3/2018 | Martin et al. |

FOREIGN PATENT DOCUMENTS

| | | | | |
|---|---|---|---|---|
| EP | 3018268 A1 * | 5/2016 | ........ | E05B 47/0615 |
| GB | 2516950 A | 2/2015 | | |
| JP | 2002250160 A | 9/2002 | | |
| KR | 20060004151 A | 1/2006 | | |
| KR | 200449719 Y1 * | 10/2008 | ........ | E05B 47/0012 |
| KR | 200446206 Y1 * | 10/2009 | ........ | E05B 47/0012 |
| KR | 100986229 B1 * | 10/2010 | ........ | E05B 15/0205 |
| KR | 20140004895 U * | 9/2014 | ........ | E05B 47/0012 |
| WO | 2013120149 A1 | 8/2013 | | |

OTHER PUBLICATIONS

Machine translation of EP-3018268-A1 (Year: 2016).*
Machine translation of KR 100986229 B1 (Year: 2010).*
Annotated machine translation of KR 20140004895 U (Year: 2014).*
Annotated machine translation of DE-102011103337-A1 with paragraph numbers (Year: 2012).*
Annotated machine translation of EP 3018268 A1 with paragraph numbers (Year: 2016).*
International Search Report and Written Opinion mailed Dec. 28, 2017, for International Application No. PCT/US17/052345, 7 pages.

* cited by examiner

MOTOR GEAR DRIVE RELEASE

CLAIM FOR PRIORITY

This application is a continuation application of U.S. patent application Ser. No. 15/709,396, entitled "Motor Gear Drive Release," and filed Sep. 19, 2017, which claims the benefit of U.S. Provisional Patent Application No. 62/396,794, entitled "Method, System and Apparatus for a Fully Functional Modern Day Smart Lock," and filed Sep. 19, 2016. The content of the above-identified application is incorporated herein by reference in its entirety.

TECHNICAL FIELD

This disclosure relates to an electromechanical lock, and in particular releasing a gear drive for a motor when manually operating an electromechanical lock.

BACKGROUND

Door locks can include a deadbolt as a locking mechanism. For example, the door lock can include a lock cylinder with a key slot on one side of the cylinder. The other side of the cylinder can include a paddle, or a twist knob. The rotation of the cylinder using the key (inserted into the key slot and rotated) or the paddle (moved or rotated to another position) can result in the deadbolt of the lock to retract (e.g., to unlock the door) or extend (e.g., to lock the door). However, some homeowners find it cumbersome to be limited to locking or unlocking the door lock of a door using the key or the paddle. Additionally, the homeowner might not know whether the door is fully locked, or the state of the door lock when away from the home.

SUMMARY

Some of the subject matter described herein includes an electromechanical smart lock configured for wireless communication with a smartphone to lock and unlock a door of a home, the electromechanical smart lock installed within the door. The electromechanical smart lock includes: a deadbolt configured to be positioned to lock or unlock the door; a paddle configured to rotate to position the deadbolt in a mechanical mode of operation for the electromechanical smart lock; a motor configured to position the deadbolt in an electromechanical mode of operation for the electromechanical smart lock, the motor turned on to position the deadbolt upon an instruction provided by the smartphone; and a disengagement mechanism having an engagement cog and a worm gear hub, the worm gear hub being part of a gear train of the motor, and the disengagement mechanism configured to disengage the engagement cog from the worm gear hub upon rotation of the paddle to position the deadbolt by retracting engagement teeth of the engagement cog away from the worm gear hub, and the disengagement mechanism configured to maintain engagement of the engagement cog with the worm gear hub upon use of the motor to position the deadbolt.

In some implementations, a first amount of force is applied to the engagement cog in the mechanical mode of operation, and a second amount of force is applied to the engagement cog in the electromechanical mode of operation, the first amount of force being more than the second amount of force.

Some of the subject matter described herein also includes an apparatus comprising: a deadbolt configured to be positioned to lock or unlock a door; and a disengagement mechanism having an engagement cog and a gear train of a motor, the disengagement mechanism configured to mechanically position the deadbolt by disengaging the engagement cog from the gear train of the motor, and configured to electromechanically position the deadbolt by engaging the engagement cog with the gear train of the motor.

In some implementations, the apparatus includes a paddle configured to rotate mechanically to position the deadbolt by transferring force from the rotation of the paddle to the engagement cog such that it retracts away from the gear train of the motor.

In some implementations, the gear train of the motor is not rotated as the engagement cog rotates as the deadbolt is positioned upon the rotation of the paddle.

In some implementations, the apparatus includes a key slot configured to rotate to mechanically position the deadbolt by transferring force from the rotation of the key slot to the engagement cog such that it retracts away from the gear train of the motor.

In some implementations, the gear train of the motor is not rotated as the engagement cog rotates as the deadbolt is positioned upon rotation of the key slot.

In some implementations, mechanically positioning the deadbolt corresponds to a first amount of force applied to the engagement cog, electromechanically positioning the deadbolt corresponds to a second amount of force applied to the engagement cog, the first amount of force being more than the second amount of force.

In some implementations, the first amount of force results in the engagement cog to retract away from the gear train of the motor.

In some implementations, the second amount of force results in the engagement cog to not retract away from the gear train of the motor.

In some implementations, the gear train of the motor includes a gear train hub having engagement teeth, the engagement cog having engagement teeth, wherein the engagement teeth of the engagement cog and the engagement teeth of the gear train hub are arranged to be interlocked together to engage the engagement cog with the gear train of the motor.

Some of the subject matter described herein also includes an apparatus comprising: a deadbolt configured to be positioned to lock or unlock a door; and a disengagement mechanism having an engagement cog and a gear train of a motor, the disengagement mechanism configured to receive a first amount of force to apply to the engagement cog to mechanically position the deadbolt, and configured to receive a second amount of force to apply to the engagement cog to electromechanically position the deadbolt, the first amount of force being higher than the second amount of force.

In some implementations, mechanically positioning the deadbolt includes disengaging the engagement cog from the gear train of the motor.

In some implementations, disengaging the engagement cog from the gear train includes retracting the engagement cog from the gear train.

In some implementations, the engagement cog includes engagement teeth, the gear train includes engagement teeth, and retracting the engagement cog from the gear train includes adjusting the position of the engagement cog such that the engagement teeth of the engagement cog are not interlocked with the engagement teeth of the gear train.

In some implementations, the gear train includes a worm gear hub, and the engagement cog retracts away from the worm gear hub to disengage the engagement cog from the gear train.

In some implementations, electromechanically positioning the deadbolt includes engaging the engagement cog with the gear train of the motor.

In some implementations, the apparatus includes a paddle configured to rotate mechanically to position the deadbolt by transferring force from the rotation of the paddle to the engagement cog such that it retracts away from the gear train of the motor.

In some implementations, the gear train of the motor is not rotated as the engagement cog rotates as the deadbolt is positioned upon the rotation of the paddle.

In some implementations, the apparatus includes a key slot configured to rotate mechanically to position the deadbolt by transferring force from the rotation of the paddle to the engagement cog such that it retracts away from the gear train of the motor.

DETAILED DESCRIPTION

This disclosure describes devices and techniques for an electromechanical lock. In one example, the electromechanical lock can be either mechanically or electromechanically operated to retract or extend a deadbolt to unlock or lock a door, respectively. Mechanically retracting or extending the deadbolt can include a homeowner manually rotating a paddle or a key that is inserted into a key slot of the electromechanical lock. Rotation of the paddle or key can cause an actuation tail to rotate, causing a set of mechanical cogs, cams, and other components to rotate. This results in the deadbolt to retract or extend depending upon on the direction of the rotation (e.g., clockwise to extend the deadbolt and counter-clockwise to retract the deadbolt). Electromechanically retracting or extending the deadbolt can include the homeowner using a smartphone to instruct the electromechanical lock to operate a motor used to retract or extend the deadbolt. This can result in a motor to turn on to cause the components to rotate and position the deadbolt appropriately.

As disclosed herein, a disengagement mechanism can de-couple the motor from the components that rotate by decoupling its gear train, or gear drive, from the components when the electromechanically lock is manually operated. Thus, when the homeowner manually, or mechanically, operates the electromechanical lock using the paddle or the key, the motor would not be forward driven (e.g., to extend the deadbolt) or backward driven (e.g., to retract the deadbolt). This can be useful because some types of gear drives cannot be backward driven. Moreover, wear and tear of the motor and the gear train can be reduced. Additionally, there is also an improved feel and user experience due to not having to back drive a drive train of the motor.

When the electromechanical lock is electromechanically operated (e.g., the motor is turned on to position the deadbolt), the disengagement mechanism can couple the gear train of the motor with the components. Thus, the motor can cause the rotation of the components to extend or retract the deadbolt. As a result, the electromechanical lock can operate in a mechanical mode or electromechanical mode by decoupling or coupling the gear train of the motor from the components that rotate to position the deadbolt, respectively. By contrast, in some other systems, the motor should be used in the mechanical operation, or manual mode, to reposition the drive train or gear train in a way to avoid back driving the motor. This results in additional power requirements and creates a dependency on the motor to operate even during manual operation to avoid back driving.

Figure 1:
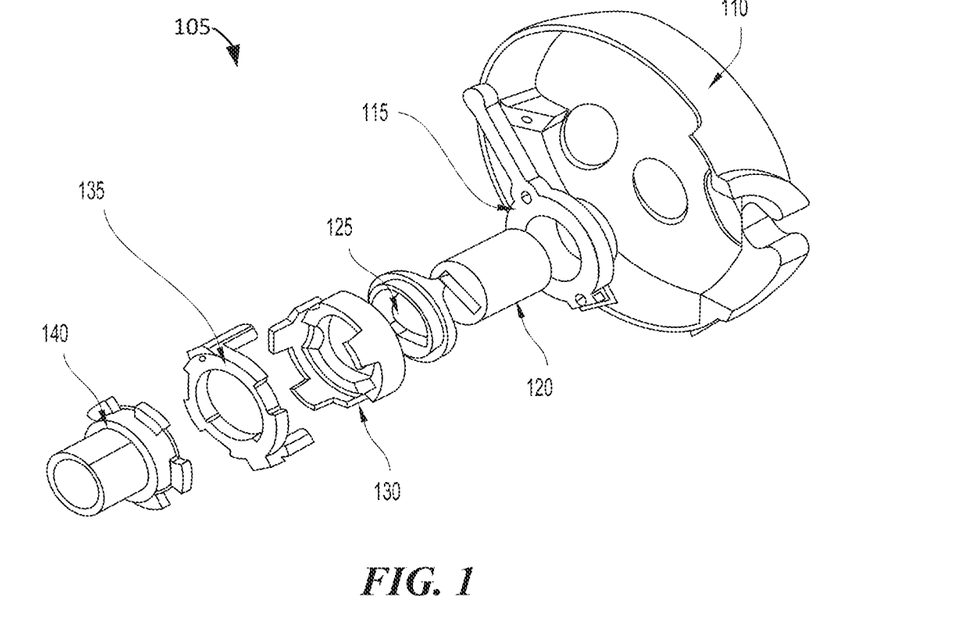
FIG. 1 illustrates an example of a disengagement mechanism of an electromechanical lock.

In more detail, FIG. 1 illustrates an example of a disengagement mechanism of an electromechanical lock. In FIG. 1, electromechanical lock 105 includes housing 110 enclosing throw arm 115, tail insert 120, release cam 125, engagement cog 130, throw arm mount 135, and worm gear hub 140. As discussed later, these components within housing 110 can form a disengagement mechanism that can couple a gear train used by a motor to electromechanically lock or unlock a door by extending or retracting a deadbolt of electromechanical lock 105, respectively. By contrast, the disengagement mechanism can decouple the gear train used by the motor to mechanically lock or unlock the door, for example, via the use of a paddle or key manually operated by a homeowner. This can be done because different amounts of force are applied between the mechanical or electromechanical modes of operation of electromechanical lock 105. For example, the mechanical mode of operation can apply more force such that an engagement cog (as discussed later) can disengage by retracting its engagement teeth away from the gear train of the motor.

Figure 2A:
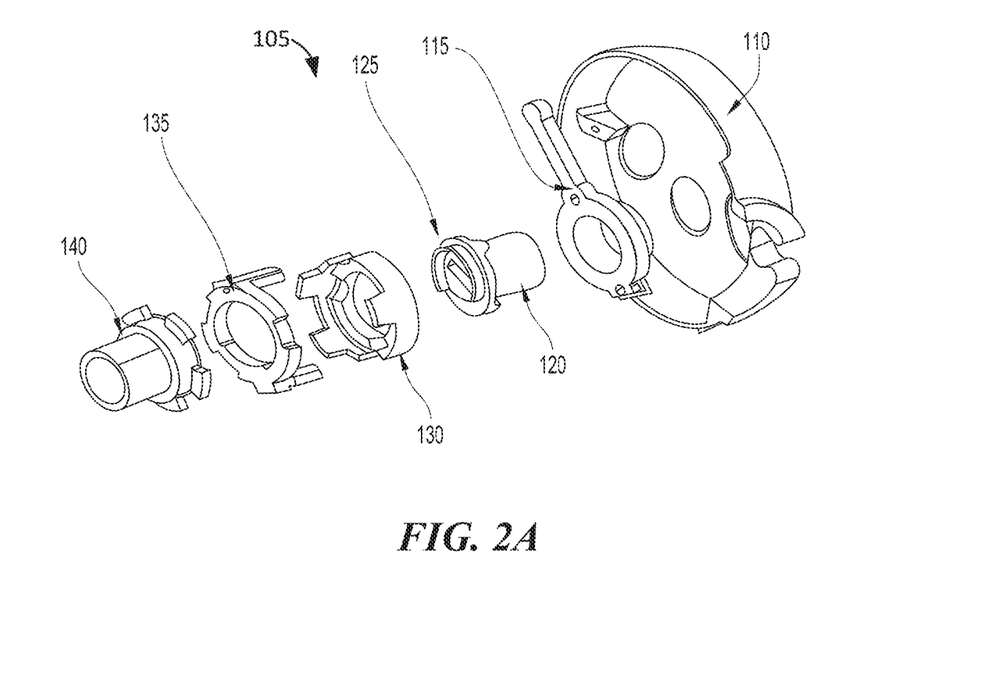
FIGS. 2A-2E illustrate an example of an assembly of a disengagement mechanism of an electromechanical lock.

FIGS. 2A-2E illustrate an example of an assembly of a disengagement mechanism of an electromechanical lock. The arrangement of the components of the disengagement mechanism allow for the electromechanical or mechanical operation of electromechanical lock 105. In FIG. 2A, the components of the disengagement mechanism can be enclosed within housing 110 (e.g., depicting one half of the housing). In FIG. 2A, release cam 125 can be a rotating mechanical linkage that rotates as tail insert 120 rotates due to the manual operation of the paddle or key, or due to the electromechanical operation using a motor, as previously discussed. In some implementations, the motor might not rotate release cam 125 with as much force as if a homeowner is manually using the paddle or the key. Thus, if the homeowner operates electromechanical lock 105 manually, this might cause enough force to transfer to release cam 125 such that release cam 125 rotates and positions to a new position, also causing engagement cog 130 (e.g. force is also transferred upon engagement cog 130) to reposition such that its engagement teeth are no longer meshed or coupled with the pockets between the engagement teeth of worm gear hub 140 (e.g., part of the gear train which can include one or more gears that can be driven by the motor). The amount of force applied to engagement cog 130 by the rotation of release cam 125 can be large enough such that the engagement teeth "push out" of the pockets of worm gear hub 140. This results in a motor coupled to worm gear hub 140 to be effectively decoupled from the remaining components and, therefore, electromechanical lock 105 can operate in a mechanical mode without disturbing the motor due to worm gear hub 140 not rotating.

However, if the motor is activated or turned on and causes the rotation of the components by rotating worm gear hub 140 that is part of its gear train, there might not be enough force for release cam 125 to apply to engagement cog 130 such that have the engagement teeth of engagement cog 130 would be pushed out from the pockets and retracted away from the engagement teeth or pockets of worm gear hub 140. This results in the motor being coupled with the components and, therefore, electromechanical lock 105 can operate in an electromechanical mode rather than a mechanical mode. This is explained further with respect to FIGS. 3A-D.

Figure 2B:
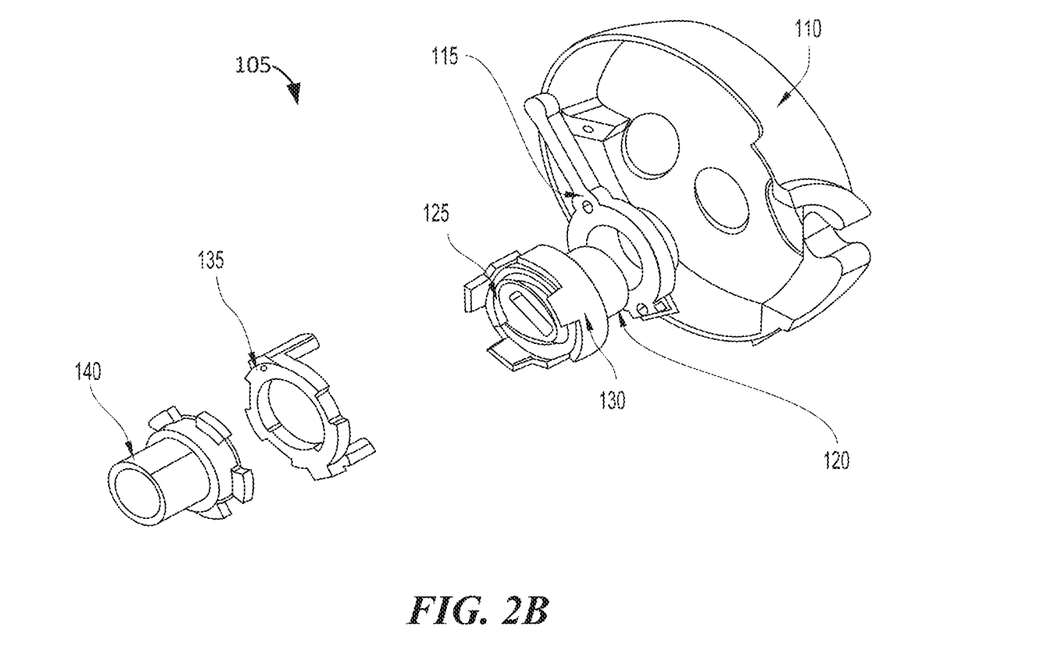
Figure 2C:
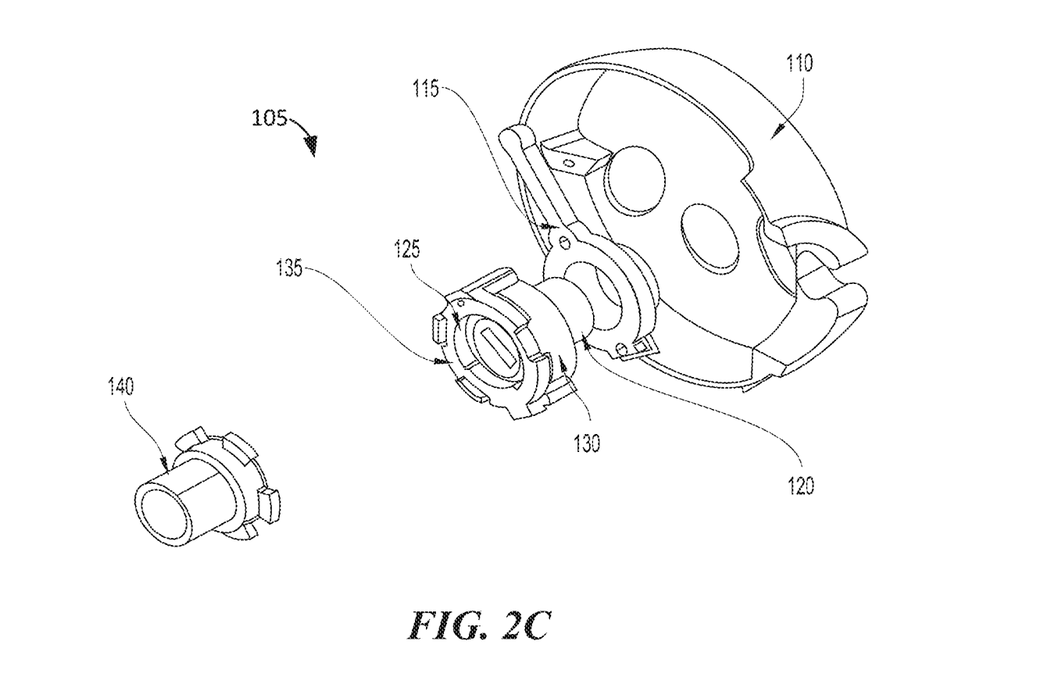
Figure 2D:
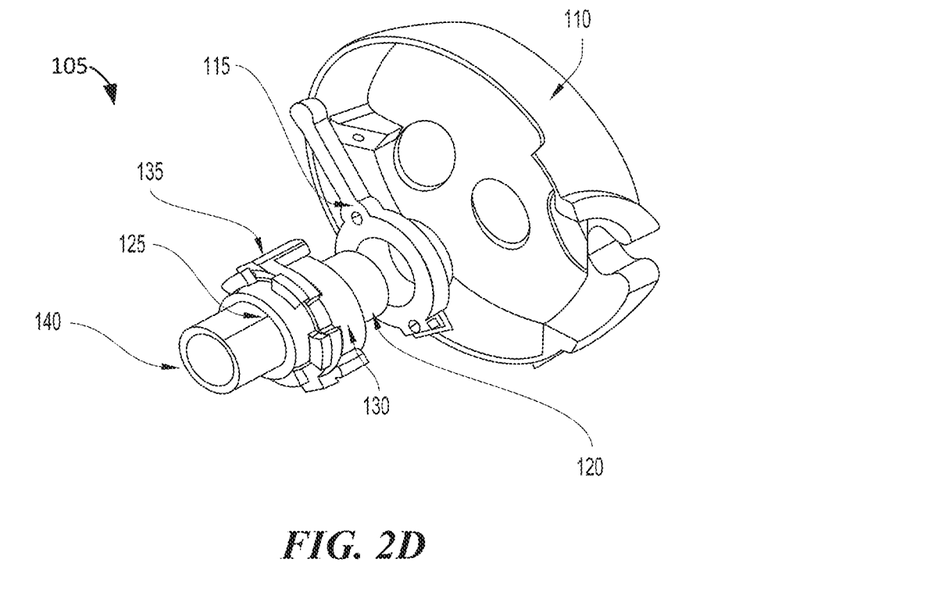
Figure 2E:
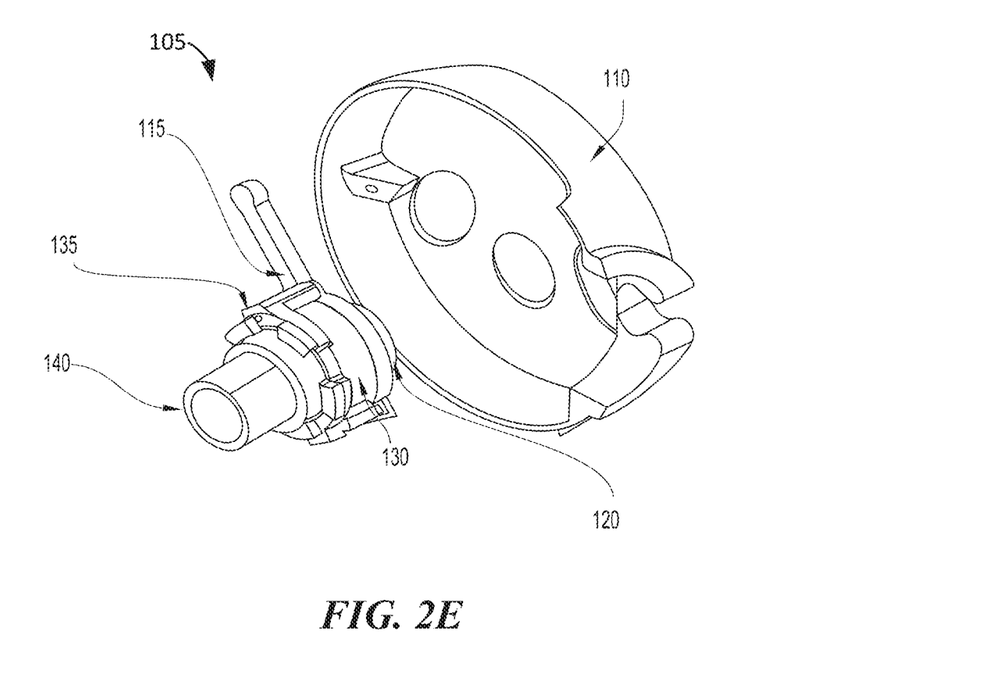

In FIG. 2A, release cam 125 is positioned upon tail insert 120 such that it rotates when tail insert 120 rotates, which is when the paddle, key, or motor cause its rotation. In FIG. 2B, engagement cog 130 is positioned upon release cam 125. Thus, release cam 125 can rotate and cause engagement cog 130 to also rotate and reposition, for example, retract or extend its engagement teeth away from or towards the engagement teeth of worm gear hub 140, respectively, and as discussed later herein. In FIG. 2C, throw arm mount 135 can be positioned upon engagement cog 130. In FIG. 2D, worm gear hub 140 can be positioned upon throw arm mount 135. In FIG. 2E, throw arm 115 can be coupled with throw arm mount 135, resulting in an assembly of the components of the disengagement mechanism.

Figure 3A:
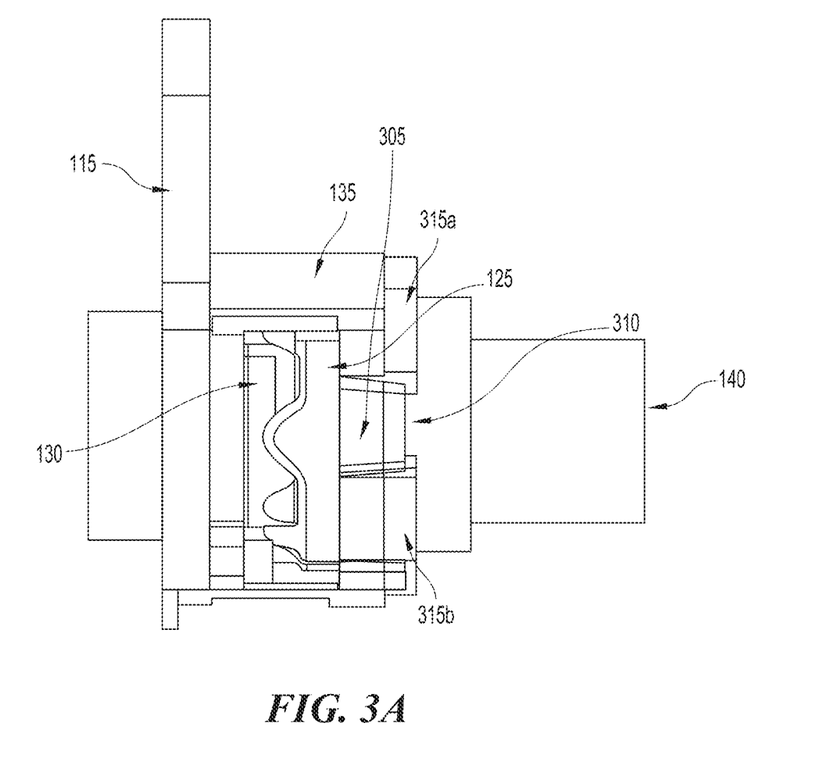
FIGS. 3A-3D illustrate an example of an operation of a disengagement mechanism of an electromechanical lock.

FIGS. 3A-3D illustrate an example of an operation of a disengagement mechanism of an electromechanical lock. In FIG. 3A, the disengagement mechanism can be in an engaged state in which the engagement teeth of engagement cog 130 are meshed or arranged to interlock with the engagement teeth of gear hub 140. For example, in FIG. 3A, engagement tooth 305 of engagement cog 130 is positioned within pocket 310 of worm gear hub 140. Pocket 310 in FIG. 3A is formed or defined by the space in between consecutive engagement teeth of worm gear hub 140 such as engagement teeth 315a and 315b. That is, engagement tooth 305 is in between parts of worm gear hub 140 such that if worm gear hub 140 rotates (e.g., when operated by a motor), then engagement cog 130 would also rotate. This represents the scenario when electromechanical lock 105 should operate in an electromechanical mode via the motor, for example, when the homeowner uses a smartphone, tablet, smartwatch, or other electronic device to instruct electromechanical lock 105 to lock or unlock a door that houses electromechanical lock 105. The rotation of the components can cause the deadbolt of electromechanical lock 105 to extend or retract to lock or unlock the door, respectively.

Thus, the motor can provide enough force to rotate worm gear hub 140. Because the engagement teeth of engagement cog 130 are positioned such that they are engaged with worm gear hub 140 (e.g., engagement tooth 305 is positioned within pocket 310), the rotation of worm gear hub 140 causes the rotation of engagement cog 130 because the engagement teeth would experience force while they are within the pockets. This causes a corresponding rotation of throw arm mount 135. Because throw arm mount is coupled with a throw arm 115, throw arm 115 also rotates, causing the paddle of electromechanical lock 105 to rotate and the deadbolt of electromechanical lock 105 to extend to lock the door or retract to unlock the door. The amount of force that the motor generates is not enough to allow for engagement cog 130 to disengage from worm gear hub 140.

However, if the homeowner manually operates electromechanical lock by rotating the paddle or the key inserted into the key slot, then the disengagement mechanism can disengage by retracting the engagement teeth (e.g., engagement tooth 305) away from worm gear hub 140 (e.g., outside of pocket 310). This results in worm gear hub 140 not rotating while other components are rotating because the engagement teeth are not in a position to cause its rotation and the motor is not turned on.

Figure 3B:
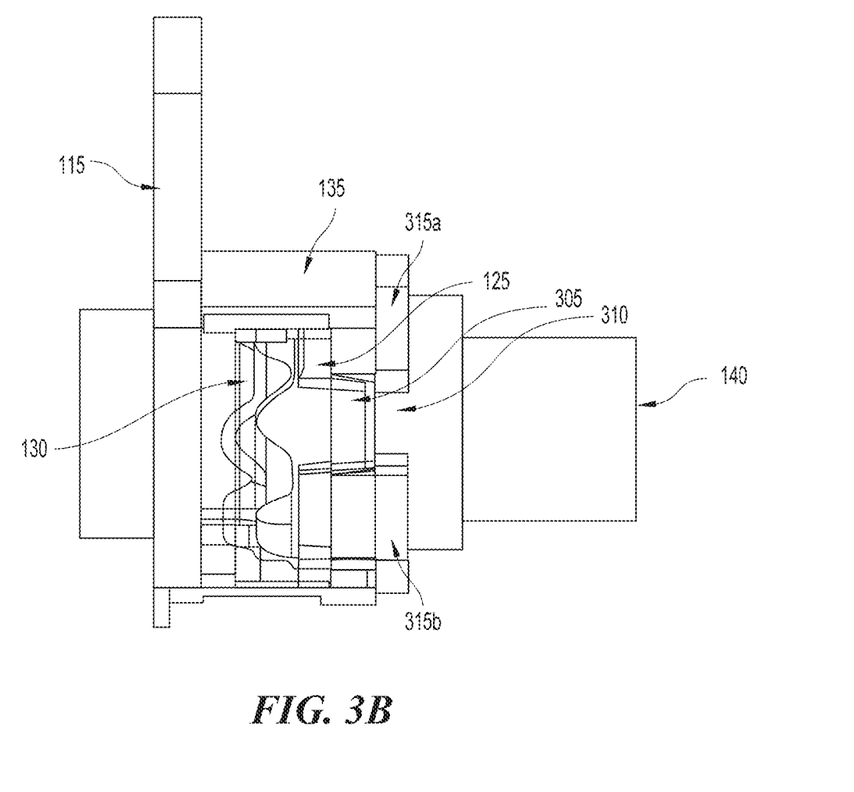

For example, in FIG. 3B, if the user rotates the paddle of electromechanical lock 105, then throw arm 115 would be rotated. The amount of force from the human hand can be higher than the amount of force provided by the motor. This results in a rotation of release cam 125 (due to release cam 125 being positioned upon tail insert 120 which is placed upon throw arm 115 that rotates with the rotation of the paddle or key) with enough force such that engagement cog 130 pushes towards throw arm 115 and away from worm gear hub 140 such that the engagement teeth of engagement cog 130 are no longer in positon to cause the rotation of worm gear hub 140. As a result, the deadbolt can be positioned without worm gear hub 140 having to rotate. Accordingly, more force is applied to engagement cog 130 during the manual operation, or mechanical mode, than during the electromechanical mode (e.g., when the motor is operating) such that engagement cog 130 can dislodge away from worm gear hub 140.

Figure 3C:
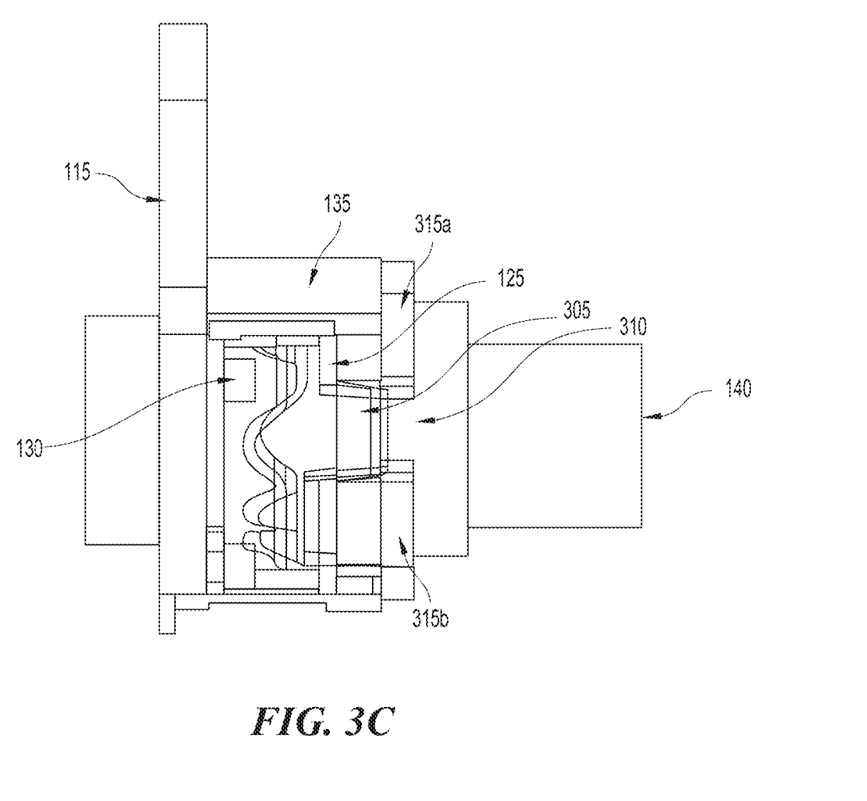
Figure 3D:
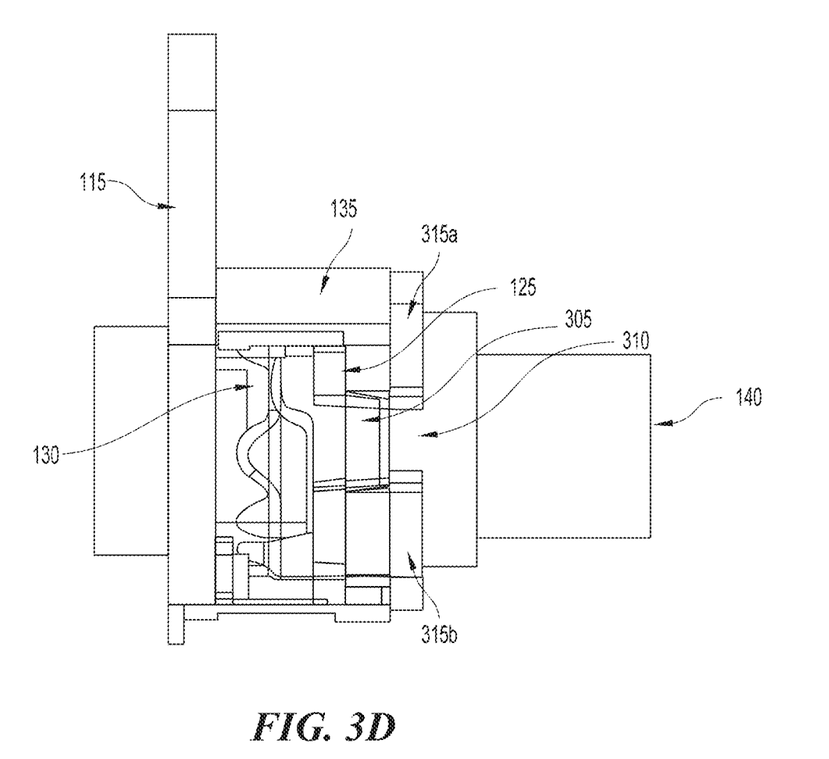

FIG. 3C depicts the position of engagement cog 130 within the first ten degrees of rotation, for example, of the paddle or key of electromechanical lock 105. As depicted in FIG. 3C, release cam 125 can rotate relative to the other components. This movement can cause the beginning of engagement teeth of engagement cog 130 to be pushed out of their corresponding pockets of worm gear hub 140, which forms part of the gear train of the motor. FIG. 3D depicts further movement, for example, beyond the first ten degrees of rotation. As depicted, in FIG. 3D, the engagement teeth of engagement cog 130 are further away from worm gear hub 140, resulting in worm gear hub 140 being disengaged from the other components and, therefore, not rotating when engagement cog 130 or other components rotate as the deadbolt is extended or retracted. Because worm gear hub 140 is stationary while the other components rotate, this causes the motor to not be driven when electromechanical lock 105 is to be manually, or mechanically, operated.

Figure 4:
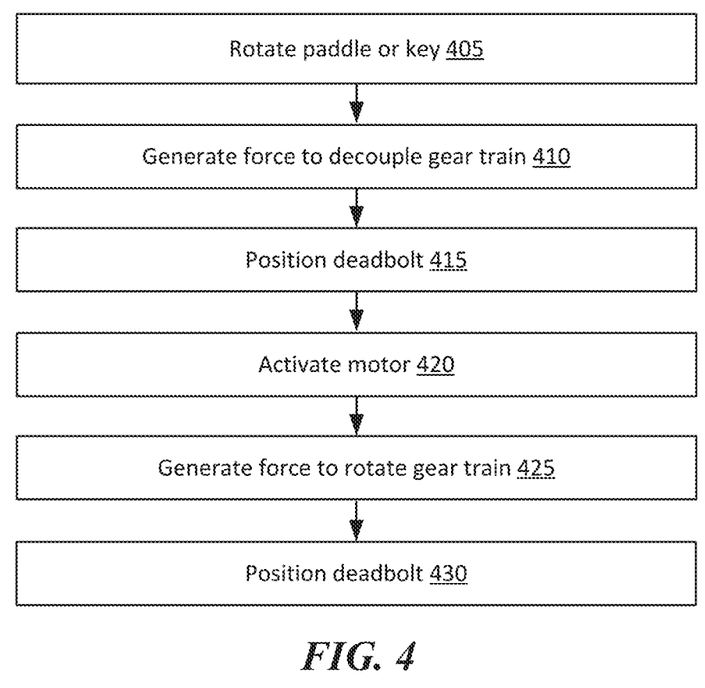
FIG. 4 illustrates an example of a block diagram for operating a disengagement mechanism of an electromechanical lock.

FIG. 4 illustrates an example of a block diagram for operating a disengagement mechanism of an electromechanical lock. In FIG. 4, a homeowner can rotate a paddle or key of the electromechanical lock (405). This can result in the operation of the electromechanical lock in the mechanical mode. The force generated and applied via the rotation of the paddle or key can be enough to decouple the gear train of the motor (410). Thus, the deadbolt can be positioned (415). This can be performed without forward driving or backward driving the motor because worm gear hub 140 is effectively decoupled from engagement cog 130 such that worm gear hub 140 does not rotate if engagement cog 130 rotates. As previously discussed, this can be the result of the engagement teeth of engagement cog 130 retracting away from worm gear hub 140.

Additionally, the motor of the electromechanical lock can be activated (420). For example, the electromechanical lock can receive an instruction from a smartphone, tablet, smartwatch, laptop computer, smart glasses, or other electronic device to lock or unlock the door. This can cause the motor to generate enough force to rotate its gear train (425). For example, worm gear hub 140 can rotate and generate enough force to rotate engagement cog 130. However, the amount of force can be less than the amount of force applied to engagement cog 130 when the paddle or key is rotated and, therefore, the engagement teeth of engagement cog 130 can still be engaged with worm gear hub 140. The deadbolt can then be positioned (430). As a result, the electromechanical lock can also be positioned via the motor in an electromechanical mode.

As previously discussed, the techniques disclosed herein can prevent a motor being forward driven or backward driven when it is not turned on (e.g., when the electromechanical lock should operate in mechanical mode as the user turns the paddle or uses the key). Additionally, this can reduce wear and tear on the gears of the gear train and the motor, increasing the life span of the electromechanical lock. The techniques described herein can also provide a better user experience because the motor would not be forward driven or backward driven when the electromechanical lock is to be mechanically operated, reducing undesirable noises that would otherwise occur when the motor is forward driven or backward driven. Moreover, the arrangement of gears, cogs, etc. of the disengagement mechanism can be a relatively small size, ensuring that the electromechanical smart lock can fit within the space allotted for a door lock within the door. Thus, the electromechanical lock described herein and its corresponding parts including the disengagement mechanism can also be backwards compatible with existing door lock housings, for example, the disengagement mechanism described herein can be placed within housing 110 of an existing lock. For example, the locking mechanism (including the deadbolt) of a lock can be removed and replaced with the electromechanical lock and the housing 110 of the replaced lock can still be used.

Figure 5:
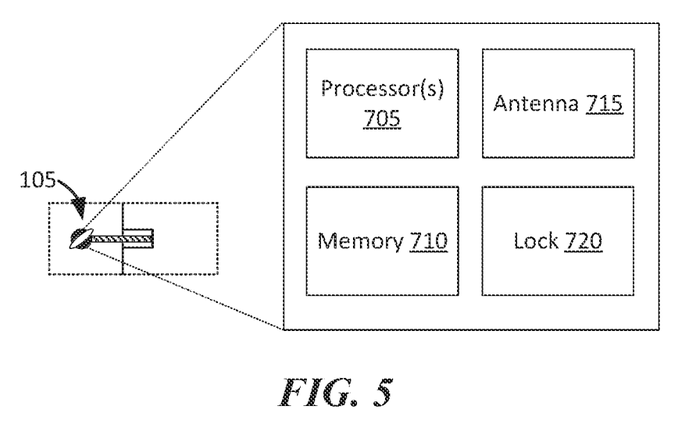
FIG. 5 illustrates an example of an electromechanical lock.

FIG. 5 illustrates an example of an electromechanical lock. In FIG. 5, electromechanical lock 105 includes a processor 705, memory 710, antenna 715, and lock components 720 (e.g., the components used to implement retracting and extending the deadbolt such as those described in FIGS. 1-5). In some implementations, electromechanical lock 105 can also include touchscreen displays, speakers, microphones, as well as other types of hardware such as non-volatile memory, an interface device, camera, radios, etc. to lock components 720 providing the techniques and systems disclosed herein. For example, lock components 720 can implement a variety of modules, units, components, logic, etc. implemented via circuitry and other hardware and software to provide the functionalities described herein along with processor 705. Various common components (e.g., cache memory) are omitted for illustrative simplicity. The electromechanical lock in FIG. 5 is intended to illustrate a hardware device on which any of the components described in the example of FIGS. 1-4 (and any other components described in this specification) can be implemented. The components of the electromechanical lock can be coupled together via a bus or through some other known or convenient device.

The processor 705 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 705 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for disengaging a motor of an electromechanical lock, comprising:
    rotating an engagement mechanism;
    rotating a release cam positioned upon a tail insert, the release cam including one or more projections in abutment with an engagement cog, and the engagement mechanism coupled to the release cam;
    rotating the engagement cog, the release cam sheathed within the engagement cog; and retracting engagement teeth of the engagement cog from engagement pockets of a worm gear hub via rotation of the one or more projections on the release cam;
    wherein the engagement teeth of the engagement cog slide past the engagement pockets of the worm gear hub such that the engagement cog is disconnected from the worm gear hub thereby disengaging the motor;
    wherein the engagement teeth of the engagement cog disconnect from the engagement pockets of the worm gear hub;
    wherein the worm gear hub remains stationary and is disengaged from the engagement cog;
    and
    wherein the worm gear hub is part of a gear train of the motor.

2. The method of claim 1, wherein the engagement mechanism comprises a throw arm of a key.

3. The method of claim 1, wherein the engagement teeth and the engagement pockets are interlocked prior to rotation of the engagement mechanism.

4. The method of claim 1, further comprising:
    extending a deadbolt, the deadbolt coupled to the engagement mechanism.

5. The method of claim 1, further comprising:
    retracting a deadbolt, the deadbolt coupled to the engagement mechanism.

6. A method for positioning a deadbolt of an electromechanical lock, comprising:
    activating a motor,
    rotating a worm gear hub, worm gear hub being disconnected from an engagement cog, wherein the worm gear hub is part of a gear train of the motor and wherein the worm gear hub is configured to disconnect from and connect with the engagement cog;
    engaging engagement pockets of the worm gear hub with engagement teeth of the engagement cog, wherein a release cam positioned upon a tail insert is sheathed within the engagement cog, the release cam including one or more projections in abutment with the engagement cog;
    causing the worm gear hub to become connected with the engagement teeth of the engagement cog;
    rotating the engagement cog; and
    positioning the deadbolt, wherein the deadbolt is coupled to the engagement cog.

7. The method of claim 6, wherein the deadbolt is extended.

8. The method of claim 6, wherein the deadbolt is retracted.

9. The method of claim 6, wherein the motor operates due to instructions received from a smart device.

10. The method of claim 9, wherein the smart device comprises a smartphone, a tablet, a smartwatch, or an electronic device capable of giving instructions.

* * * * *